3,389,004
ULTRAVIOLET LIGHT STABILIZERS FOR
PLASTIC MATERIALS
Hans Dressler, Pitcairn, and Kenneth G. Reabe, Delmont,
Pa., assignors to Koppers Company, Inc., a corporation
of Delaware
No Drawing. Filed Feb. 23, 1966, Ser. No. 529,189
6 Claims. (Cl. 106—176)

ABSTRACT OF THE DISCLOSURE 3-salicyloylcarbazole derivatives are useful as ultraviolet light stabilizing agents for plastic material. The stabilizers are effective for protecting polyethylene, polypropylene, polystyrene, polyvinyl acetate, polyvinyl chloride, copolymers of vinyl chloride and vinylidene chloride, nitrocellulose, ethylcellulose, cellulose acetate, and polyester resins. The stabilizing agent is generally added in an amount of between 0.01 and 5 percent by weight of the plastic material.

---

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

In recent years organic compounds have become available which can absorb ultraviolet light and convert it to less harmful forms of energy, such as heat, vibrational energy, or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity, especially for stabilizing plastics used in the food industry.

As a general rule, an effective ultraviolet light stabilizer should have a molar extinction coefficient ($\epsilon$) of about 10,000; that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons. One disadvantage of presently available commercial stabilizers is that their extinction coefficient is too low over a broad band in the ultraviolet light region to be effective for general use.

Quite surprisingly, we have discovered that certain 3-salicyloylcarbazole derivatives are compatible with a large number of plastic materials and exhibit outstanding ultraviolet light absorbing properties over a wide range. These compounds do not impart any substantial color to transparent, colorless plastics.

It is therefore an object of the present invention to provide a composition which is resistant to degradation by ultraviolet radiation.

It is another object of the present invention to provide plastic compositions containing the 3-salicyloylcarbazole derivatives which are substantially resistant to ultraviolet deterioration.

In accordance with the present invention, we have discovered that derivatives of 3-salicyloylcarbazole are particularly useful as ultraviolet light stabilizing agents for plastic materials.

Useful 3-salicyloylcarbazoles are compounds having the formula:

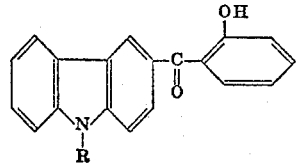

In the above formula R is hydrogen or a straight chain alkyl radical having from 1–6 carbon atoms.

The ultraviolet light stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the ultraviolet light-absorbing agent in an appropriate solvent, such as hexane or benzene. It is also possible to incorporate the ultraviolet light-absorbing agent in a finished article by introducing the plastic material into a bath containing the ultraviolet light-absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique. In this connection it should be noted that the solubility of the stabilizers is good in both polar and non-polar solvents, thus enhancing its compatibility with various polymers.

The plastic material should contain a stabilizing amount of the ultraviolet light-absorbing agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation to numerous plastic materials which are sensitive to ultraviolet light. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure.

The ultraviolet stabilizer is effective for protecting polyethylene, polypropylene, polystyrene, polyvinyl acetate, polyvinyl chloride, copolymers of vinyl chloride and vinylidene chloride, cellulose resins, such as nitrocellulose, ethylcellulose, and cellulose acetate, and numerous other materials. The agent can be used alone or together with other additives, such as fillers, antioxidants, pigments, etc.

The invention is further illustrated by the following examples:

Example I

A mixture of 160 grams of 105% superphosphoric acid, 15.0 grams (0.109 mole) of salicylic acid, 22.3 grams (0.115 mole) of 9-n-butylcarbazole, and 33.5 grams (0.25 mole) of dry zinc chloride was stirred at 25° C. to a thick, creamy slurry. During two hours 28.0 grams (0.138 mole) of phosphorous pentachloride were then added incrementally at 25° C. The resulting dark green paste was slowly warmed to 60° C. during a four hour period and then held at 60° C. for 13 hours. The reaction was then quenched in 2 liters of ice water and filtered. Material adhering to parts of the flask was dissolved in 150 milliliters of benzene and 200 milliliters of 5% sodium bicarbonate with warming. The organic layer was separated and evaporated to dryness. The residue was combined with the filter cake and reslurried in 200 milliliters of hot sodium bicarbonate. After filtration, washing, and drying, 35.5 grams of a green-blue solid was obtained having a melting point of about 128–136° C. Recrystallization from glacial acetic acid gave 12.8 grams (38% yield) of greenish crystals having a melting point of 149.0–150.5° C. A second recrystallization from 50/50 n-heptane/toluene, using activated charcoal to decolorize the product, gave pale yellow crystals having a melting point of 153.0–154.5° C. The infra-red spectrum of the product confirmed it to be 3-salicyloyl-9-n-butylcarbazole having the formula:

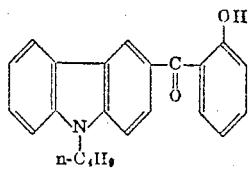

The product is an excellent ultraviolet light stabilizer. It has a molar extinction coefficient of log $\epsilon$ equal to or greater than 4.0 in the spectral range of 220–375 millimicrons.

Example II

A mixture of 160 grams of 105% superphosphoric acid, 15.0 grams (0.109 mol) of salicylic acid, 19.7 grams (0.11 mole) of 9-ethylcarbazole, and 33.5 grams (0.25 mole) of anhydrous zinc chloride was stirred at 25° C. until a smooth, tan slurry was obtained. To this slurry was added 28.0 grams (0.138 mole) of phosphorous pentachloride during 2 hours in small portions. The reaction temperature rose to 30° C. during this addition. The mixture was then stirred and warmed to 60° C. during 3 hours, held at 60° C. for 8 hours, and then poured into 2 liters of ice-water with mixing. The mixture was stirred at 75° C., then cooled and filtered. The solids were crushed and slurried with 100 milliliters of 5% sodium bicarbonate solution, and 100 milliliters of toluene at 60–70° C. The organic layer was evaporated to dryness to leave 25.0 grams of a dark green, resinous product. This was taken up in 100 milliliters of hot benzene. N-heptane was then added until the solution just clouded. The solution was concentrated, cooled and filtered to give 11.5 grams (35% yield) of crude product, M.P. 114–118° C. After two recrystallizations in 50/50 n-heptane/benzene pale yellow crystals of M.P. 119–120° C. were obtained. The infra red spectrum of the product confirmed it to be 3-salicyloyl-9-ethylcarbazole having the formula:

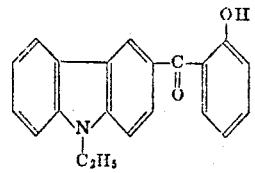

The product is an excellent ultra violet light stabilizer having a molar extinction coefficient of log $\epsilon$ equal to or greater than 4 in the spectral range of 290–360 millimicrons.

Example III

The products of Example I, 3-salicyloyl-9-n-butylcarbazole, and Example II, 3-salicyloyl-9-ethylcarbazole, were tested to determine their ability to stabilize polystyrene against ultraviolet light degradation. The stabilizers in an amount of 0.1 part by weight were blended with 100 parts of polystyrene beads by rolling in a jar mill. The stabilized bead samples and a control sample were extruded into pellets from which discs two inches in diameter and ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below:

TABLE I

| Stabilizer | Weight Percent | Yellowness Factor |
| --- | --- | --- |
| 3-salicyloyl-9-n-butylcarbazole | 0.1 | 1.0 |
| 3-salicyloyl-9-ethylcarbazole | 0.1 | 1.2 |
| Control | None | 5.2 |

Similar results are obtained when polyethylene, polypropylene, copolymers of vinylidene chloride and vinyl chloride or styrene-modified phthalic-maleic-glycol type polyesters are used in the foregoing example.

Example IV

The product of Example I was further tested to evaluate its novel ultraviolet stabilizing effects by preparing polystyrene test samples containing 3-salicyloyl-9-n-butylcarbazole and severally related compounds, namely: 3,6-dibenzoyl-9-n-butylcarbazole; 3,6-diacetyl-9-n-butylcarbazole; and 1-benzoyl-3,6-dichlorocarbazole and subjecting the samples to the same testing procedures of Example III. The results are given in the following table:

TABLE II

| Stabilizer | Weight Percent | Yellowness Factor |
| --- | --- | --- |
| 3,6-dibenzoyl-9-n-butylcarbazole | 0.1 | 46.5 |
| 3,6-diacetyl-9-n-butylcarbazole | 0.1 | 18.6 |
| 1-benzoyl-3,6-dichlorocarbazole | 0.1 | 75.0 |
| 3-salicyloyl-9-n-butylcarbazole | 0.1 | 1.0 |
| Control | None | 5.2 |

The results indicate that the related compounds were not beneficial as ultraviolet light stabilizers but rather are detrimental as additives, causing more yellowing to occur than in the control.

It may be postulated from the foregoing that the 3-salicyloylcarbazole compounds have the type of structure (ortho-hydroxy aromatic ketone with chelate ring) which is specifically useful in the carbazole series for use as an ultraviolet light stabilizer; none of the other carbazoles in Example IV having the ortho-hydroxy group.

We claim:

1. A polymeric composition stabilized against ultraviolet degradation comprising a polymer selected from the group consisting of polyethylene, polypropylene, polystyrene, polyvinyl acetate, polyvinyl chloride, copolymers of vinylidene chloride and vinylchloride, nitrocellulose, ethyl cellulose, cellulose acetate and polyester resins and containing a stabilizer having the formula:

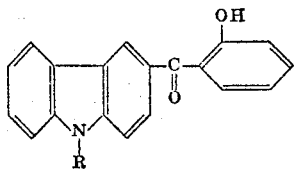

Wherein R is a member selected from the group consisting of hydrogen and a straight chain alkyl radical having from 1–6 carbon atoms and wherein the amount of the stabilizer is 0.01 to 5 percent by weight of said polymer.

2. The stabilized polymeric composition of claim 1 wherein the polymer is polystyrene.

3. The stabilized polymeric composition of claim 1 wherein R is an ethyl radical.

4. The stabilized polymeric composition of claim 1 wherein R is an n-butyl radical.

5. The stabilized polymeric composition of claim 1 wherein the polymer is polystyrene, the amount of stabilizer is 0.01 to 5 percent by weight of said polystyrene and the stabilizer is 3-salicyloyl-9-n-butylcarbazole having the formula:

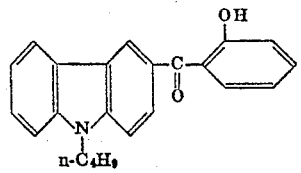

6. The stabilized polymeric composition of claim 1 wherein the polymer is polystyrene, the amount of stabilizer is 0.01 to 5 percent by weight of said polystyrene and the stabilizer is 3-salicyloyl-9-ethylcarbazole having the formula:

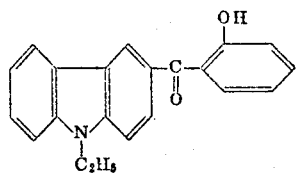

References Cited
UNITED STATES PATENTS

| | | | |
|---|---|---|---|
| 2,906,728 | 9/1959 | Schweitzer | 260—45.8 |
| 3,062,887 | 11/1962 | Levering | 260—45.8 |
| 3,117,129 | 1/1964 | Boyle | 260—45.8 |
| 3,143,523 | 8/1964 | Caldo | 260—45.8 |
| 3,225,000 | 12/1965 | Welch | 260—45.8 |
| 3,337,357 | 8/1967 | Strobel et al. | 260—45.8 |

OTHER REFERENCES

Margueyrol—Study of different stabilizers—Mem. poudres 23, 158–77 (1928); Chemical Abstracts 23, 5043 (1929).

MORRIS LIEBMAN, *Primary Examiner.*

JULIUS FROME, *Examiner.*

H. H. FLETCHER, *Assistant Examiner.*